United States Patent
Sasaki et al.

(10) Patent No.: US 10,596,637 B2
(45) Date of Patent: Mar. 24, 2020

(54) TOOL

(71) Applicant: TUNGALOY CORPORATION, Iwaki-shi, Fukushima (JP)

(72) Inventors: Yasutake Sasaki, Iwaki (JP); Syunsuke Miyazawa, Iwaki (JP); Yuichiro Fukushima, Iwaki (JP)

(73) Assignee: TUNGALOY CORPORATION, Iwaki-Shi, Fukushima (JP)

( * ) Notice: Subject to any disclaimer, the term of this patent is extended or adjusted under 35 U.S.C. 154(b) by 54 days.

(21) Appl. No.: 15/890,663

(22) Filed: Feb. 7, 2018

(65) Prior Publication Data

US 2018/0272433 A1 Sep. 27, 2018

(30) Foreign Application Priority Data

Mar. 21, 2017 (JP) .................................. 2017-054174

(51) Int. Cl.
*B23B 27/14* (2006.01)
*B23B 27/20* (2006.01)
(Continued)

(52) U.S. Cl.
CPC .......... *B23B 27/148* (2013.01); *B23B 27/145* (2013.01); *B23B 27/20* (2013.01);
(Continued)

(58) Field of Classification Search
CPC ..... B23B 27/148; B23B 27/27; B23B 27/145; B23B 2222/28; B23B 2200/0452;
(Continued)

(56) References Cited

U.S. PATENT DOCUMENTS

| 5,183,362 A * | 2/1993 | Kuroyama | ............ B23B 27/141 |
| | | | 407/116 |
| 7,322,776 B2 * | 1/2008 | Webb | .................... B23B 27/145 |
| | | | 407/113 |

(Continued)

FOREIGN PATENT DOCUMENTS

| JP | 2000-326111 A | 11/2000 |
| JP | 2006-526508 A | 11/2006 |

(Continued)

OTHER PUBLICATIONS

First Office Action issued for Japanese Patent Application No. 2017-054174 dated Sep. 5, 2017.

(Continued)

*Primary Examiner* — Noah S Wiese
(74) *Attorney, Agent, or Firm* — Foley & Lardner LLP

(57) ABSTRACT

A cutting edge tip of a cubic boron nitride sintered body has improved joint strength to a substrate of a cemented carbide. A cutting edge tip of a cubic boron nitride sintered body has improved crater wear resistance. A tool 10 of the present invention includes a substrate 12 of a cemented carbide and a cutting edge tip 14 of a cubic boron nitride sintered body joined to the substrate 12. The cutting edge tip 14 has a thickness covering an upper surface 12a to a lower surface 12b of the substrate 12. The cubic boron nitride sintered body contains 50 volume % or more and 95 volume % or less of cubic boron nitride and 5 volume % or more and 50 volume % or less of a binder phase. The cubic boron nitride has an average grain size of 1.0 μm or more and 6.0 μm or less.

2 Claims, 4 Drawing Sheets

(51) Int. Cl.
*C04B 35/5831* (2006.01)
*C04B 35/63* (2006.01)

(52) U.S. Cl.
CPC ...... *C04B 35/5831* (2013.01); *C04B 35/6303* (2013.01); *B23B 2200/0428* (2013.01); *B23B 2200/0433* (2013.01); *B23B 2200/0452* (2013.01); *B23B 2200/3618* (2013.01); *B23B 2222/28* (2013.01); *B23B 2224/04* (2013.01); *B23B 2224/08* (2013.01); *B23B 2224/12* (2013.01); *B23B 2224/24* (2013.01); *B23B 2224/28* (2013.01); *B23B 2224/32* (2013.01); *B23B 2224/36* (2013.01); *B23B 2226/125* (2013.01); *C04B 2235/3217* (2013.01); *C04B 2235/3244* (2013.01); *C04B 2235/3813* (2013.01); *C04B 2235/3821* (2013.01); *C04B 2235/3843* (2013.01); *C04B 2235/3847* (2013.01); *C04B 2235/3856* (2013.01); *C04B 2235/3873* (2013.01); *C04B 2235/3886* (2013.01); *C04B 2235/762* (2013.01)

(58) Field of Classification Search
CPC ........ B23B 2200/1433; C04B 35/5831; C04B 2235/3856; C04B 2235/3886
See application file for complete search history.

(56) References Cited

U.S. PATENT DOCUMENTS

| | | | |
|---|---|---|---|
| 7,824,134 B2* | 11/2010 | Webb | B23B 27/145 |
| | | | 407/113 |
| 9,242,299 B2* | 1/2016 | Taylor | B23B 27/145 |
| 2004/0228694 A1 | 11/2004 | Webb et al. | |
| 2017/0189969 A1* | 7/2017 | Hirosaki | B23B 27/14 |

FOREIGN PATENT DOCUMENTS

| | | |
|---|---|---|
| JP | 2007-500609 A | 1/2007 |
| JP | 2015-110258 A | 6/2015 |
| WO | WO-2004/105983 A1 | 12/2004 |
| WO | WO-2006/059949 A1 | 6/2006 |
| WO | WO-2015/199230 A1 | 12/2015 |
| WO | WO-2015199230 A1 * | 12/2015 ........... B23B 27/148 |

OTHER PUBLICATIONS

Extended European Search Report dated Aug. 2, 2018 in corresponding application No. 18156644.9.

* cited by examiner

TOOL

CROSS-REFERENCE TO RELATED PATENT APPLICATION

The present application claims priority under 35 U. S. C. § 119 to Japanese Patent Application No. 2017-054174 filed Mar. 21, 2017. The contents of this application are incorporated herein by reference in their entirety.

TECHNICAL FIELD

The present invention relates to a tool comprising a substrate of a cemented carbide and a cutting edge tip of a cubic boron nitride sintered body.

BACKGROUND ART

Cubic boron nitride has hardness next to diamond and excellent thermal conductivity. Such cubic boron nitride is also characterized by low affinity for iron. Cubic boron nitride sintered bodies comprising the cubic boron nitride and a binder phase of metal or ceramics have been applied to cutting tools, wear resistant tools, and the like.

For example, as a known conventional technique related to a tool using such a cubic boron nitride sintered body, Patent Document 1 describes a throw away tip. The throw away tip described in Patent Document 1 includes a tip body of a cemented carbide and a cutting edge tip of a very hard sintered body. The cutting edge tip is joined by brazing to a recess formed in the tip body. In a joint surface of the tip body and the cutting edge tip, gaps are formed partially.

Patent Document 2 describes a cutting insert including an insert body of a cemented carbide and a cutting edge tip of a very hard material, such as a cubic boron nitride sintered body. The cutting edge tip is joined to the insert body by brazing.

PRIOR ART DOCUMENT

Patent Document

Patent document 1: JP 2000-326111A
Patent document 2: JP 2006-526508A

SUMMARY OF THE INVENTION

Problems to be Solved by the Invention

In recent years, for improvement of the machining efficiency, the cutting conditions tend to be stricter than the past. In such a tendency, a tool life even longer than before is required. The tool described in Patent Document 1 above, however, has the cutting edge tip of a cubic boron nitride sintered body with a small thickness, sometimes causing insufficient joint strength of the cutting edge tip to the tip body. In this case, in conditions of putting a high load on the tool, it may cause a problem that the cutting edge tip peels off the tip body.

The throw away tip described in Patent Document 1 above and the cutting insert described in Patent Document 2 above have a problem of oxidation of the cubic boron nitride sintered body, causing a decrease in crater wear resistance of the cutting edge tip. Progress of crater wear of the cutting edge tip causes a decrease in strength of the cutting edge tip. As a result, chipping or fracture occurs in the cutting edge tip, leading to a shorter tool life.

The present invention has been made in view of the above circumstances. The present invention relates to a tool comprising a substrate of a cemented carbide and a cutting edge tip of a cubic boron nitride sintered body joined to the substrate. An object of the present invention is to improve joint strength of the cutting edge tip to the substrate. It is also an object of the present invention to improve crater wear resistance of the cutting edge tip.

Means to Solve the Problems

The summary of the present invention is as follows.

(1) A tool, comprising: a substrate of a cemented carbide; and a cutting edge tip of a cubic boron nitride sintered body joined to the substrate, wherein
the cutting edge tip has a thickness covering an upper surface to a lower surface of the substrate,
the cubic boron nitride sintered body contains 50 volume % or more and 95 volume % or less of cubic boron nitride and 5 volume % or more and 50 volume % or less of a binder phase, and
the cubic boron nitride has an average grain size of 1.0 μm or more and 6.0 μm or less.

(2) The tool according to (1), wherein the cubic boron nitride sintered body contains 70 volume % or more and 85 volume % or less of the cubic boron nitride and 15 volume % or more and 30 volume % or less of the binder phase.

(3) The tool according to (1) or (2), wherein the cubic boron nitride has an average grain size of 2.0 μm or more and 4.5 μm or less.

(4) The tool according to any one of (1) to (3), wherein a joint surface of the cutting edge tip and the substrate contains a curved area.

(5) The tool according to (4), wherein the curved area contains a curve with a radius of curvature of 50 μm or more and 1.0 mm or less.

(6) The tool according to (4) or (5), wherein the curved area has a concave portion and a convex portion, and
a distance between a tip end of the concave portion and a tip end of the convex portion is 0.1 mm or more and 0.7 mm or less.

(7) The tool according to any one of (1) to (6), wherein the cutting edge tip is brazed to the substrate.

(8) The tool according to any one of (1) to (7), wherein the binder phase contains a compound including at least one metal selected from the group consisting of Ti, Zr, Hf, V, Nb, Ta, Cr, Mo, W, Al, and Co and at least one element selected from the group consisting of carbon, nitrogen, oxygen, and boron.

Effects of the Invention

According to the present invention, it is possible to improve joint strength of the cutting edge tip of the cubic boron nitride sintered body to the substrate of the cemented carbide. In addition, according to the present invention, it is possible to improve crater wear resistance of the cutting edge tip.

EMBODIMENTS TO CARRY OUT THE INVENTION

Embodiments of the present invention are described below in detail.

A tool according to an embodiment includes a substrate of a cemented carbide and a cutting edge tip of a cubic boron nitride sintered body joined to the substrate.

Figure 1:
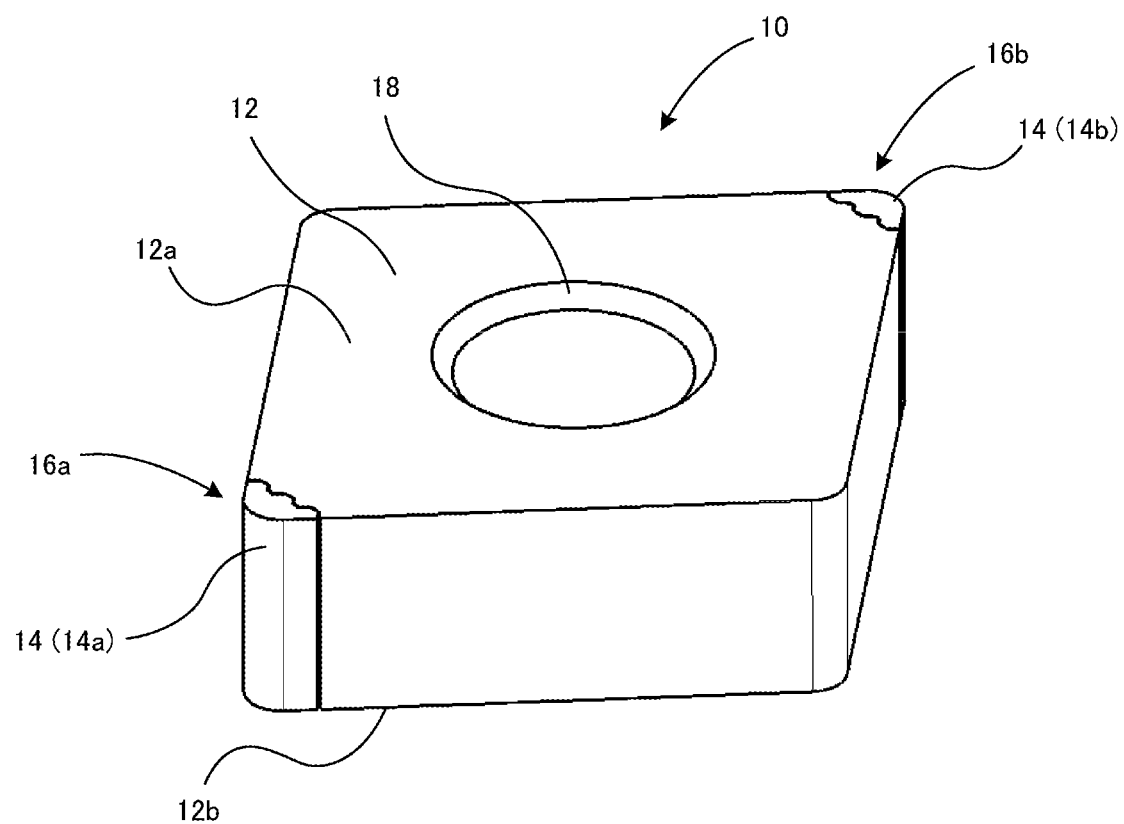
FIG. 1 is a perspective view of a tool.
Figure 2:
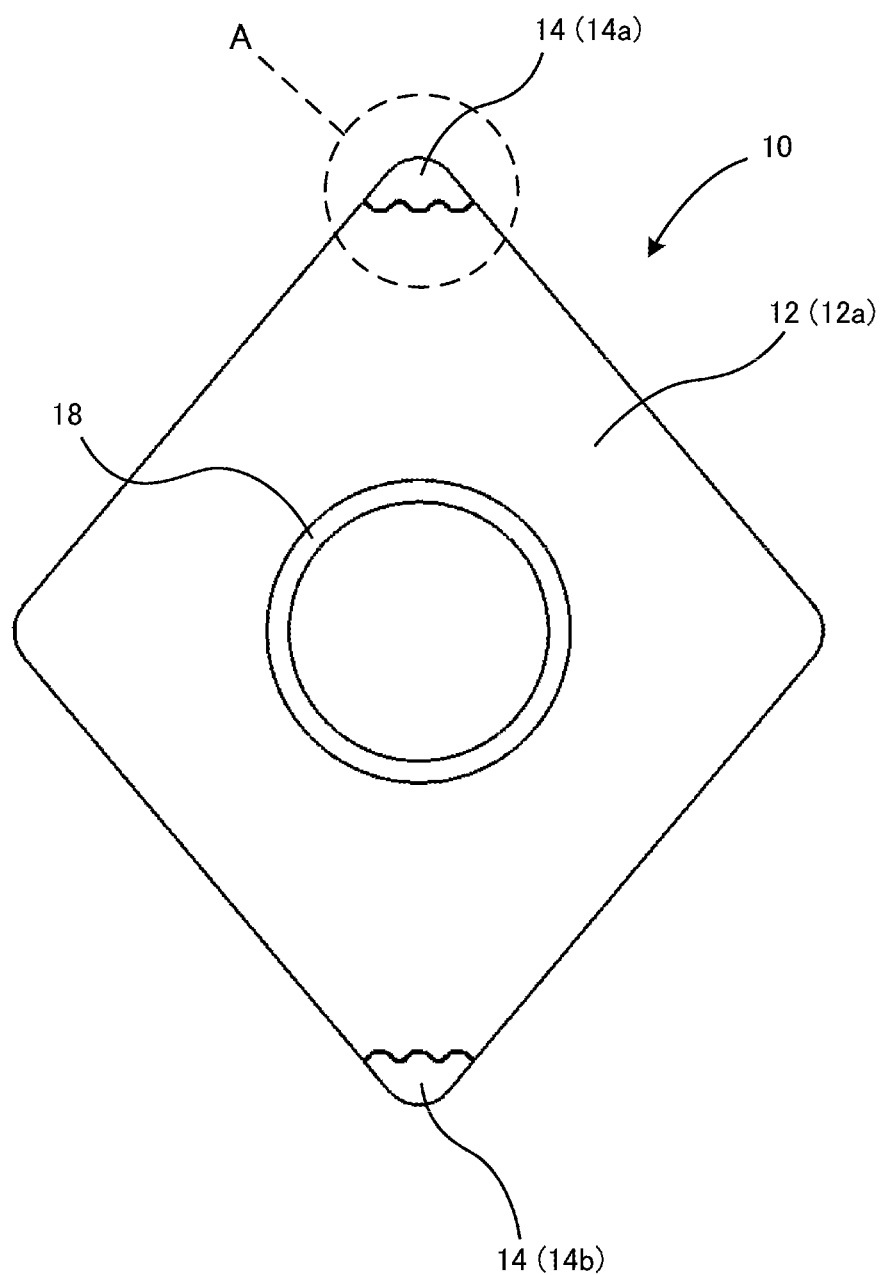
FIG. 2 is a top view of the tool.
Figure 3:
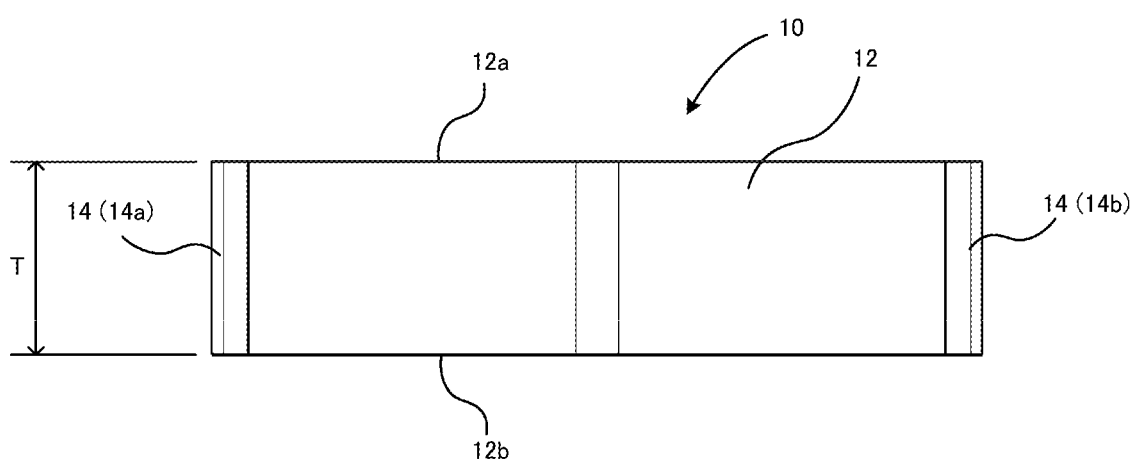
FIG. 3 is a side view of the tool.
Figure 4:
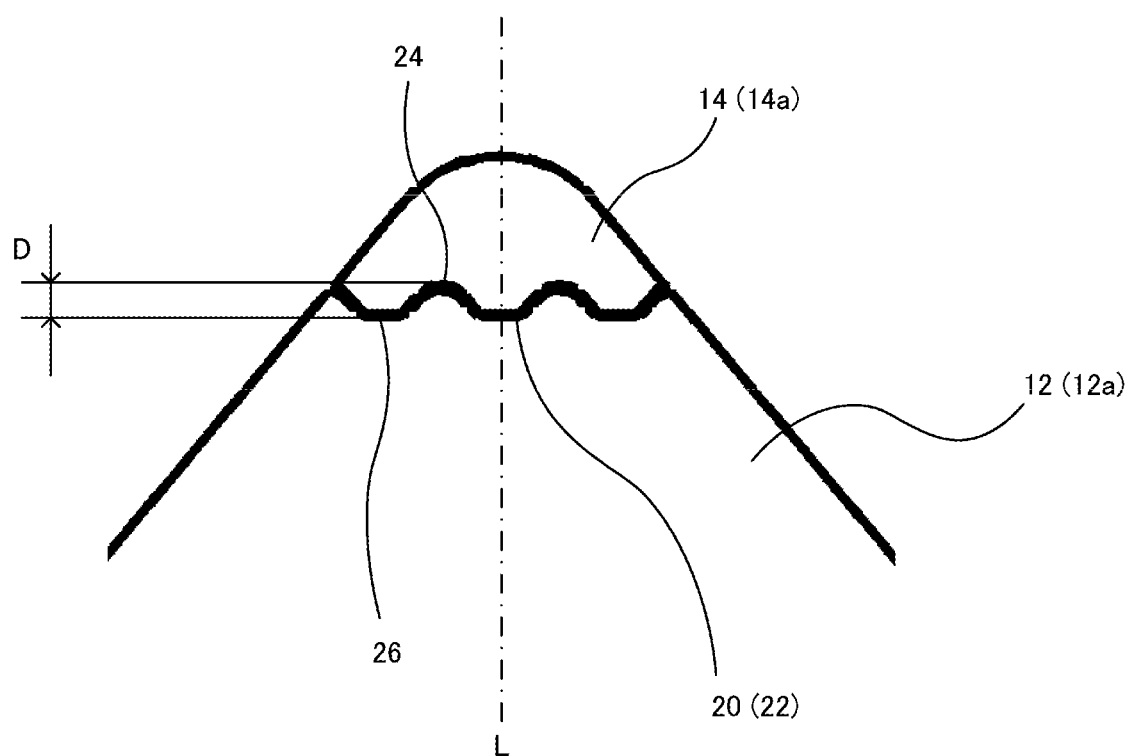
FIG. 4 is an enlarged view of an area A of the tool illustrated in FIG. 2.

FIG. 1 is a perspective view of a tool according to an embodiment of the present invention. FIG. 2 is a top view of the tool. FIG. 3 is a side view of the tool. FIG. 4 is an enlarged view of an area A of the tool illustrated in FIG. 2.

As illustrated in FIGS. 1 to 4, a tool 10 according to the present embodiment has a substrate 12 formed in an approximately rhombic flat plate shape. The substrate 12 has two corners 16a and 16b, as acute angles, respectively with two cutting edge tips 14a and 14b joined by brazing. In the descriptions below, the two cutting edge tips 14a and 14b may be collectively expressed as "cutting edge tip 14".

As illustrated in FIGS. 1 and 2, the substrate 12 has an upper surface 12a with a mounting hole 18 formed in the central portion to penetrate the substrate 12 in the thickness direction. It is possible to mount the tool 10 comprising the substrate 12 and the cutting edge tip 14 to a holder of machining equipment and the like by using the mounting hole 18.

As illustrated in FIG. 3, the cutting edge tip 14 has a thickness T covering the upper surface 12a to a lower surface 12b of the substrate 12. Such a configuration increases a joint area of the cutting edge tip 14 to the substrate 12, allowing an increase in joint strength of the cutting edge tip 14 to the substrate 12.

An increase in the contact area between the cutting edge tip 14 and the substrate 12 increases, for example, an effect of dissipating the heat generated in the cutting edge tip 14 during cutting to the substrate 12. As a result, chemical reaction wear of the cutting edge tip 14 is suppressed, enabling improvement of the crater wear resistance of the cutting edge tip 14. Further, it is possible to prevent softening in the portion of the cutting edge tip 14 brazed to the substrate 12 due to the heat. As a result, it is possible to even more increase the joint strength of the cutting edge tip 14 to the substrate 12.

As illustrated in FIG. 3, an upper surface of the cutting edge tip 14 preferably coincides with the upper surface 12a of the substrate 12. A lower surface of the cutting edge tip 14 preferably coincides with the lower surface 12b of the substrate 12. The thickness T of the cutting edge tip 14 is preferably substantially identical to a thickness of the substrate 12. Note that the thickness T of the cutting edge tip 14 may be slightly smaller than the thickness of the substrate 12. For example, the upper surface of the cutting edge tip 14 may be located slightly below the upper surface 12a of the substrate 12. Even in such a case, the cutting edge tip 14 is considered to substantially have the thickness T covering the upper surface 12a to the lower surface 12b of the substrate 12, and the effects of the present invention described above are thus obtained.

The cutting edge tip 14 is preferably integrally connected from the upper surface through the lower surface. Between the upper surface and the lower surface of the cutting edge tip 14, there is preferably no substrate 12 of the cemented carbide. Such a configuration of the cutting edge tip 14 allows an increase in the joint area of the cutting edge tip 14 to the substrate 12, enabling even more increase in the joint strength of the cutting edge tip 14 to the substrate 12.

As illustrated in FIG. 4, when looking at an upper surface of the tool 10, a joint surface 20 of the cutting edge tip 14 and the substrate 12 preferably contains a curved area 22. The joint surface 20 containing the curved area 22 causes an increase in the joint area of the cutting edge tip 14 to the substrate 12, thereby increasing the joint strength of the cutting edge tip 14 to the substrate 12. Since the contact area between the substrate 12 and the cutting edge tip 14 increases, the effect of dissipating the heat generated in the cutting edge tip 14 during machining to the substrate 12 is increased, allowing suppression of the chemical reaction wear of the cutting edge tip 14.

The curved area 22 preferably contains a curve with the radius of curvature of 50 μm or more and 1.0 mm or less. The curved area 22 containing a curve with the radius of curvature of 50 μm or more allows prevention of defect in the cutting edge tip 14 when the cutting edge tip 14 is brazed to the substrate 12. When there is defect in the cutting edge tip 14, the defect area remains as a void after brazing of the cutting edge tip 14 and the void sometimes causes a decrease in braze strength.

Meanwhile, the curved area 22 containing a curve with the radius of curvature of 1.0 mm or less causes an increase in the brazed area of the cutting edge tip 14 of the cubic boron nitride sintered body and the substrate 12 of the cemented carbide, allowing an increase in the joint strength of the cutting edge tip 14 to the substrate 12. In addition, it is possible to increase the effect of dissipating the heat generated in the cutting edge tip 14 during machining to the substrate 12 and thus suppress the chemical reaction wear of the cutting edge tip 14. Further, it is possible to enhance accuracy of the positioning of the blade edge in brazing of the cutting edge tip 14 to the substrate 12 and thus improve fracture resistance of the cutting edge tip 14.

As illustrated in FIG. 4, the curved area 22 preferably contains a wavy shape having a concave portion 24 and a convex portion 26. The concave portion 24 and the convex portion 26 are configured respectively with a curve and a straight line. A distance D between a tip end of the concave portion 24 and a tip end of the convex portion 26 (maximum distance in the direction along a center line L of the tool 10) is preferably 0.1 mm or more and 0.7 mm or less.

The curved area 22 containing the above wavy shape allows even more increase in the accuracy of the positioning of the blade edge in brazing of the cutting edge tip 14 to the substrate 12. As a result, it is possible to improve the fracture resistance of the cutting edge tip 14.

In particular, when the distance D between the tip end of the concave portion 24 and the tip end of the convex portion 26 is 0.1 mm or more, the accuracy of the positioning of the blade edge increases when brazing the cutting edge tip 14 to the substrate 12. In addition, the contact area between the cutting edge tip 14 and the substrate 12 increases, causing an increase in the joint strength of the cutting edge tip 14 to the substrate 12 and an increase in the effect of dissipating the heat generated in the cutting edge tip 14 during machining to the substrate 12.

Meanwhile, when the distance D between the tip end of the concave portion 24 and the tip end of the convex 26 portion is 0.7 mm or less, the strength of the cutting edge tip 14 of the cubic boron nitride sintered body increases, allowing suppression of cracks propagating in the cutting edge tip 14 during machining.

Although an example of the curved area 22 containing a wavy shape is described above, the shape of the curved area 22 is not limited to such shape. The curved area 22 may have a shape of allowing an increase in the contact area between the substrate 12 and the cutting edge tip 14 compared with the case of a straight line.

Although an example of the cutting edge tip 14 joined to the substrate 12 by brazing is described above, the cutting edge tip 14 may be joined to the substrate 12 by another measure. For example, the cutting edge tip 14 may be joined to the substrate 12 by diffusion bonding.

In the tool 10 of the present embodiment, the cutting edge tip 14 is composed of a cubic boron nitride sintered body. The cubic boron nitride sintered body contains 50 volume % or more and 95 volume % or less of cubic boron nitride and 5 volume % or more and 50 volume % or less of a binder phase. The cubic boron nitride sintered body preferably contains 70 volume % or more and 85 volume % or less of cubic boron nitride and 15 volume % or more and 30 volume % or less of a binder phase.

The cubic boron nitride sintered body contains 50 volume % or more of cubic boron nitride and 50 volume % or less of a binder phase. The cubic boron nitride sintered body of such composition improves thermal conductivity of the cutting edge tip 14. Improved thermal conductivity of the cutting edge tip 14 allows suppression of the chemical reaction wear of the cutting edge tip 14, and the crater wear resistance of the cutting edge tip 14 is thus improved. In addition, it is possible to suppress softening of a brazing material for joining of the cutting edge tip 14 due to the heat, preventing a shift in the position of the cutting edge tip 14 during machining. The cubic boron nitride sintered body more preferably contains 70 volume % or more of cubic boron nitride and 30 volume % or less of a binder phase. The cubic boron nitride sintered body of such composition allows the effects of the present invention described above to be obtained more securely.

The cubic boron nitride sintered body contains 95 volume % or less of cubic boron nitride and 5 volume % or more of a binder phase. The cubic boron nitride sintered body of such composition improves the fracture resistance of the cutting edge tip 14. The cubic boron nitride sintered body more preferably contains 85 volume % or less of cubic boron nitride and 15 volume % or more of a binder phase. The cubic boron nitride sintered body of such composition allows the effects of the present invention described above to be obtained more securely.

In the tool 10 of the present embodiment, the cubic boron nitride contained in the cubic boron nitride sintered body preferably has an average grain size of 1.0 μm or more and 6.0 μm or less, more preferably, 2.0 μm or more and 4.5 μm or less.

When the cubic boron nitride has an average grain size of 1.0 μm or more, the thermal conductivity of the cutting edge tip 14 is improved. When the thermal conductivity of the cutting edge tip 14 is improved, the chemical reaction wear of the cutting edge tip 14 is suppressed and the crater wear resistance of the cutting edge tip 14 is thus improved. In addition, it is possible to suppress softening of the brazing material for joining of the cutting edge tip 14 due to the heat, preventing a shift in the position of the cutting edge tip 14 during machining.

Meanwhile, when the cubic boron nitride has an average grain size of 6.0 μm or less, the fracture resistance of the cutting edge tip 14 is improved.

The cubic boron nitride sintered body contains cubic boron nitride and a binder phase.

The binder phase preferably contains at least one metal selected from the group consisting of Ti, Zr, Hf, V, Nb, Ta, Cr, Mo, W, Al, and Co. Alternatively, the binder phase preferably contains a compound including at least one metal selected from the group consisting of Ti, Zr, Hf, V, Nb, Ta, Cr, Mo, W, Al, and Co and at least one element selected from the group consisting of carbon, nitrogen, oxygen, and boron.

The tool of the present invention may be manufactured by, for example, a method including the following processes (A) to (H).

Process (A): 50 to 90 volume % of cubic boron nitride having an average grain size of 1.0 to 6.0 μm and 10 to 50 volume % of binder phase powder having an average grain size of 0.05 to 8.0 μm are mixed (note that a total of them is 100 volume %). The binder phase powder preferably contains at least one metal selected from the group consisting of Ti, Zr, Hf, V, Nb, Ta, Cr, Mo, W, Al, and Co. Alternatively, the binder phase powder preferably contains a compound including at least one metal selected from the group consisting of Ti, Zr, Hf, V, Nb, Ta, Cr, Mo, W, Al, and Co and at least one element selected from the group consisting of carbon, nitrogen, oxygen, and boron.

Process (B): the raw material powder obtained in Process (A) is mixed by a wet ball milling for 5 to 24 hours using cemented carbide balls.

Process (C): the mixture obtained in Process (B) is formed into a predetermined shape to obtain a compact.

Process (D): the compact obtained in Process (C) is held for sintering in an ultra-high pressure generating device at a pressure of 4.0 to 7.0 GPa at a sintering temperature between 1300 and 1500 degrees for a predetermined time period.

Process (E): the sintered body obtained in Process (D) is cut out by an electric discharge machine in accordance with the tool shape.

Process (F): a substrate of a cemented carbide is prepared.

Process (G): the sintered body cut out in Process (E) is joined to the substrate prepared in Process (F) by brazing or the like.

Process (H): the tool produced in Process (G) is subjected to horning.

A coating layer may be formed on a surface of the tool produced through Processes (A) to (H). The coating layer can be formed by chemical vapor deposition or physical vapor deposition. It is possible to produce a coated tool of the present invention by forming the coating layer on the tool.

Specific examples of the tool of the present invention may include indexable cutting inserts for milling or turning, drills, end mills, and the like.

EXAMPLES

Tools of present products 1 to 10 and comparative products 1 to 5 with the composition shown in Table 1 below were prepared.

TABLE 1

| | | Cubic Boron Nitride Sintered Body | | |
|---|---|---|---|---|
| | Composition of Raw Materials (volume %) | Cubic Boron Nitride (volume %) | Binder Phase (volume %) | Composition of Binder Phase |
| Present Product 1 | 50% cBN, 5% TiN, 10% Ti(C, N), 3% TiB$_2$, 30% Al$_2$O$_3$, 2% WC | 50 | 50 | TiN, Ti(C, N), TiB$_2$, Al$_2$O$_3$, AlN, WC |
| Present Product 2 | 60% cBN, 10% TiN, 5%TiC, 5% Ti(C,N), 3% TiB$_2$, 15% Al$_2$O$_3$, 2% WC | 60 | 40 | TiN, TiC, Ti(C, N), TiB$_2$, Al$_2$O$_3$, AlN, WC |
| Present Product 3 | 75% cBN, 5% ZrO2, 15% Al$_2$O$_3$, 5% Al | 75 | 25 | ZrO$_2$, ZrN, ZrB$_2$, Al$_2$O$_3$ |
| Present Product 4 | 90% cBN, 1% Co, 1% Cr, 4% Ni, 4% Al$_2$O$_3$ | 90 | 10 | Co, Cr, Ni, Al$_2$O$_3$ |
| Present Product 5 | 60 % cBN, 15% TiN, 15% Ti(C, N), 5% TiB$_2$, 5% WC | 60 | 40 | TiN, Ti(C, N), TiB$_2$, WC |
| Present Product 6 | 70% cBN, 20% Al$_2$O$_3$, 10% Si$_3$N$_4$ | 70 | 30 | Al$_2$O$_3$, Si$_3$N$_4$ |
| Present Product 7 | 80% cBN, 5% TiN, 5% Ti(C, N), 2% TiB$_2$, 7% Al$_2$O$_3$, 1% WC | 80 | 20 | TiN, Ti(C, N), TiB$_2$, Al$_2$O$_3$, AlN, WC |
| Present Product 8 | 80% cBN, 5% TiN, 5% Ti(C, N), 2% TiB$_2$, 7% Al$_2$O$_3$, 1% WC | 80 | 20 | TiN, Ti(C, N), TiB$_2$, Al$_2$O$_3$, AlN, WC |
| Present Product 9 | 70% cBN, 5% TiN, 5% Ti(C, N), 3% TiB$_2$, 15% Al$_2$O$_3$, 2% WC | 70 | 30 | TiN, Ti(C, N), TiB$_2$, Al$_2$O$_3$, AlN, WC |
| Present Product 10 | 70% cBN, 5% TiN, 5% Ti(C, N), 3% TiB$_2$, 15% Al$_2$O$_3$, 2% WC | 70 | 30 | TiN, Ti(C, N), TiB$_2$, Al$_2$O$_3$, AlN, WC |
| Comparative Product 1 | 40% cBN, 5% TiN, 20% Ti(C, N), 3% TiB$_2$, 30% Al$_2$O$_3$, 2% WC | 40 | 60 | TiN, Ti(C, N), TiB$_2$, Al$_2$O$_3$, AlN, WC |
| Comparative Product 2 | 95% cBN, 4% Al$_2$O$_3$, 1% Si$_3$N$_4$ | 95 | 5 | Al$_2$O$_3$, Si$_3$N$_4$ |
| Comparative Product 3 | 60% cBN, 5% TiN, 10% Ti(C, N), 3% TiB$_2$, 20% Al$_2$O$_3$, 2% WC | 60 | 40 | TiN, Ti(C, N), TiB$_2$, Al$_2$O$_3$, AlN, WC |
| Comparative Product 4 | 60% cBN, 5% TiN, 10% Ti(C, N), 3% TiB$_2$, 20% Al$_2$O$_3$, 2% WC | 60 | 40 | TiN, Ti(C, N), TiB$_2$, Al$_2$O$_3$, AlN, WC |
| Comparative Product 5 | 60% cBN, 5% TiN, 10% Ti(C, N), 3% TiB$_2$, 20% Al$_2$O$_3$, 2% WC | 60 | 40 | TiN, Ti(C, N), TiB$_2$, Al$_2$O$_3$, AlN, WC |

The present products 1 to 10 and the comparative products 1 to 5 were subjected to the following measurements.

Ratios of Cubic Boron Nitride and Binder Phase Contained in Cubic Boron Nitride Sintered Body A cross-sectional structure of the cubic boron nitride sintered body was photographed by an SEM. The picture of the cross-sectional structure thus taken was analyzed using commercially available image analysis software. Specifically, respective areas occupied by the cubic boron nitride and the binder phase in the cross-sectional structure were obtained by the image analysis software. From the values of the areas, the respective ratios (volume %) of the cubic boron nitride and the binder phase contained in the cubic boron nitride sintered body were obtained.

Composition of Binder Phase

The composition of the binder phase contained in the cubic boron nitride sintered body was identified by an X-ray diffractometer.

Average Grain Size of Cubic Boron Nitride

A surface or an arbitrary cross section of the cubic boron nitride sintered body was mirror polished. Using an SEM, a backscattered electron image of the polished surface of the cubic boron nitride sintered body was observed. In addition, using an SEM, a 10,000-times magnified picture of a structure of the cubic boron nitride sintered body was taken.

Using commercially available image analysis software, a diameter of a circle having the area equal to the area of the cubic boron nitride in the picture of the structure was obtained as a grain size of the cubic boron nitride.

Using commercially available image analysis software, the grain size of the cubic boron nitride in the sintered body structure was measured according to ASTM E 112-96.

The grain sizes of a plurality of cubic boron nitride (cBN) in the picture of the structure were measured. An average of the measured grain sizes of the cubic boron nitride was obtained as the average grain size of the cubic boron nitride.

Thickness of Cutting Edge Tip

As the cutting edge tips, those having a thickness covering the upper surface to the lower surface of the substrate and those not having the thickness covering the upper surface to the lower surface of the substrate were used. In the column of "Thickness of Cutting Edge Tip from Upper Surface to Lower Surface" in Table 2, "Having" means that the cutting edge tip has a thickness covering the upper surface to the lower surface of the substrate. "Not having" means that the cutting edge tip does not have a thickness covering the upper surface to the lower surface of the substrate.

Presence of Curved Area

In the column of "Presence" of the curved area in Table 2, "Having" means that the joint portion of the cutting edge tip and the substrate has a curved area. "Not having" means that the joint portion of the cutting edge tip and the substrate has no curved area, i.e., the joint portion is a straight line.

Radius of Curvature of Curved Area

For a tool having a curved area, the radius of curvature of the curved area was measured. Specifically, an upper surface of the tool was photographed by an SEM and the taken image was analyzed using image analysis software to measure the radius of curvature of the curved area.

Distance between Tip End of Concave Portion and Tip End of Convex Portion

For the tools having a curved area, the distance between the tip end of the concave portion and the tip end of the convex portion in the curved area was measured. Specifically, an upper surface of the tool was photographed by an SEM and the taken image was analyzed using image analysis software to measure the distance between the tip end of the concave portion and the tip end of the convex portion.

Results of measurement are shown in Table 2 below.

TABLE 2

| | Average Grain Size of Cubic Boron Nitride (µm) | Thickness of Cutting Edge Tip from Upper Surface to Lower Surface | Curved Area | | Distance between Tip End of Concave Portion and Tip End of Convex Portion (mm) |
|---|---|---|---|---|---|
| | | | Presence | Radius of Curvature (µm) | |
| Present Product 1 | 2.0 | Having | Having | 250 | 0.3 |
| Present Product 2 | 2.0 | Having | Having | 500 | 0.3 |
| Present Product 3 | 4.0 | Having | Having | 500 | 0.3 |
| Present Product 4 | 4.0 | Having | Having | 250 | 0.3 |
| Present Product 5 | 1.0 | Having | Having | 50 | 0.5 |
| Present Product 6 | 6.0 | Having | Having | 250 | 0.5 |
| Present Product 7 | 2.0 | Having | Having | 250 | 0.3 |
| Present Product 8 | 4.0 | Having | Having | 1000 | 0.3 |
| Present Product 9 | 4.5 | Having | Having | 250 | 0.7 |
| Present Product 10 | 2.0 | Having | Not having | Not having | 0.0 |
| Comparative Product 1 | 4.0 | Not having | Not having | Not having | 0.0 |
| Comparative Product 2 | 4.0 | Not having | Not having | Not having | 0.0 |
| Comparative Product 3 | 4.5 | Not having | Having | 250 | 0.5 |
| Comparative Product 4 | 9.0 | Having | Not having | Not having | 0.0 |
| Comparative Product 5 | 0.5 | Not having | Not having | Not having | 0.0 |

Using the present products 1 to 10 and the comparative products 1 to 5, cutting tests were performed in the following conditions.

Continuous peripheral cutting (turning)
Workpiece material: carburized and hardened sintered metal (HRC 60 to 62)
Shape of workpiece material: Columnar shape with φ63 mm×200 mm
Cutting speed: 150 m/min.
Depth of cut: 0.75 mm
Feed rate: 0.20 mm/rev
Shape of insert: ISO CNGM 120408
Tool life: the processed length until the depth of flank wear reached 0.15 mm or processed length until fracture occurs was measured.

TABLE 3

| | Cutting Test Wear Resistance Test | |
|---|---|---|
| | Processed Length (m) | Form of Damage |
| Present Product 1 | 0.8 | Normal Wear |
| Present Product 2 | 0.9 | Normal Wear |

TABLE 3-continued

| | Cutting Test Wear Resistance Test | |
|---|---|---|
| | Processed Length (m) | Form of Damage |
| Present Product 3 | 1.1 | Normal Wear |
| Present Product 4 | 1.0 | Normal Wear |
| Present Product 5 | 0.7 | Normal Wear |
| Present Product 6 | 0.9 | Normal Wear |
| Present Product 7 | 1.2 | Normal Wear |
| Present Product 8 | 1.3 | Normal Wear |
| Present Product 9 | 1.2 | Normal Wear |
| Present Product 10 | 0.7 | Normal Wear |
| Comparative Product 1 | 0.2 | Fracture |
| Comparative Product 2 | 0.1 | Fracture |
| Comparative Product 3 | 0.5 | Fracture |
| Comparative Product 4 | 0.5 | Fracture |
| Comparative Product 5 | 0.4 | Fracture |

From the results shown in Table 3, the tools of the present invention had a markedly extended tool life more than that of the comparative products. The tools of the present invention also had notably excellent wear resistance more than that of the comparative products.

REFERENCE SIGNS LIST

10 Tool
12 Substrate
12a Upper Surface
12b Lower Surface
14 Cutting Edge Tip
20 Joint Surface
22 Curved Area
24 Concave Portion
26 Convex Portion

The invention claimed is:

1. A tool, comprising:
a substrate of a cemented carbide; and
a cutting edge tip of a cubic boron nitride sintered body joined to the substrate, wherein
the cutting edge tip has a thickness covering an upper surface to a lower surface of the substrate,
the cubic boron nitride sintered body contains 50 volume % or more and 95 volume % or less of cubic boron nitride and 5 volume % or more and 50 volume % or less of a binder phase,
the cubic boron nitride has an average grain size of 1.0 µm or more and 6.0 µm or less,
a joint surface of the cutting edge tip and the substrate contains a curved area,
the curved area contains a curve with a radius of curvature of 50 µm or more and 1.0 mm or less,
the curved area is formed so as to include an undulating portion comprising a plurality of concave portions and a plurality of convex portions, and
the plurality of concave portions and the plurality of convex portions are arranged in an alternating manner, such that a respective concave portion of the plurality of concave portions is adjacent to a respective convex portion of the plurality of convex portions.

2. The tool according to claim 1, wherein the cutting edge tip has a center line extending through a center of one of the plurality of convex portions and between two of the plurality of concave portions which are disposed on either side of the one of the plurality of convex portions.

\* \* \* \* \*